United States Patent [19]

Chelminski

[11] Patent Number: 4,597,464

[45] Date of Patent: Jul. 1, 1986

[54] METHOD AND SYSTEM FOR WELL VELOCITY SHOOTING AND VERTICAL SEISMIC PROFILING

[75] Inventor: Paul Chelminski, Norwalk, Conn.

[73] Assignee: Bolt Technology Corporation, Norwalk, Conn.

[21] Appl. No.: 381,698

[22] Filed: May 25, 1982

[51] Int. Cl.$^4$ .............................................. G01V 1/09
[52] U.S. Cl. .................................. 181/114; 181/119; 181/401; 367/144
[58] Field of Search ............... 181/113, 114, 117, 119, 181/120, 401, 110, 111, 402; 367/140, 141, 142, 144, 171, 174; 206/499, 505, 514, 515; 220/1 V, 4 D, 23.6, 406; 280/5 E

[56] References Cited

U.S. PATENT DOCUMENTS

| | | | |
|---|---|---|---|
| 2,258,285 | 10/1941 | Fish | 206/505 |
| 2,268,130 | 12/1941 | Slotnick | 181/111 |
| 3,310,128 | 3/1967 | Chelminski | 181/401 |
| 3,474,880 | 10/1969 | Gundlach | 181/114 |
| 3,727,717 | 4/1973 | Miller | 181/114 |
| 3,779,335 | 12/1973 | Chelminski | 181/119 |
| 3,800,907 | 4/1974 | Chelminski | 181/119 |
| 4,108,271 | 8/1978 | Chelminski | 181/119 |

FOREIGN PATENT DOCUMENTS 8100459 2/1981 PCT Int'l Appl. .

OTHER PUBLICATIONS

Holmes et al, "A Fluidic Approach to the Design of a Mud Pulser for Bore-Hole Telemetry While Drilling", Technical Memo Dept. of Interior, U.S. Geological Survey Aug. 1979, pp. 1-23.
Sheriff et al., "Exploration Seismology vol. I: History Theory & Data Acquisition" Text Published by Press Syndicate of the University of Cambridge.

Primary Examiner—Salvatore Cangialosi
Assistant Examiner—K. R. Kaiser
Attorney, Agent, or Firm—Parmelee, Bollinger & Bramblett

[57] ABSTRACT

A method and system are provided for well velocity shooting and vertical seismic profiling utilizing mobile seismic land sources for transmitting powerful seismic energy impulses into the earth. A plurality of nesting pairs of tanks are transported on a single vehicle to a well site where the tanks are unloaded and arranged in a suitable array, for example, in a linear array or uniformly spaced around the mouth of the well. The tanks each have a displaceable end portion serving as a diaphragm placed in contact with the ground near the well. Then the tanks are filled with a noncompressible liquid. The total effective mass of the liquid may be increased by adding density-increasing materials thereto. Air guns are suspended in the tanks submerged in the liquid therein. The air guns are fired in a predetermined manner, abruptly releasing pressurized gas into the liquid contained in the tanks for providing powerful seismic impulses which are transmitted into the ground by the displaceable diaphragms. Geophone equipment lowered into the well receives the resultant waves which have passed through the geological structures near the well, and the signals from the geophone equipment may be recorded and/or processed at ground level. Advantageously, a mobile system is provided in which a single vehicle can provide an array of four seismic sources instead of requiring two or four vehicles to provide a like number of sources.

4 Claims, 4 Drawing Figures

METHOD AND SYSTEM FOR WELL VELOCITY SHOOTING AND VERTICAL SEISMIC PROFILING

BACKGROUND OF THE INVENTION

This invention relates to mobile seismic energy land sources for seismic surveying of the earth, and more particularly, to a method and system for well velocity shooting and vertical seismic profiling for generating powerful seismic signals for deep penetration into the earth utilizing a single vehicle for transporting a plurality of seismic sources which may be arranged in any desired array at the well site.

Seismic exploration on land involves the transmission of strong seismic impulses into the earth's surface at a desired site. The impulses may be repeated at frequent intervals at the desired site, and a network of geophones is used to sense the results at various points on the ground spaced from the site, the signals from these geophones being recorded and/or processed. The geophones are coupled to the earth for receiving the resultant vibrational waves which have been reflected and/or refracted or otherwise affected by subsurface geologic strata and structures in the earth. Analysis of the signals from the geophones provides information about the conditions and characteristics of the geologic formations in the regions being surveyed. The geophones may also be suspended down a drilled well for providing information concerning the surrounding geologic formations and possible oil or gas bearing regions near the well.

Seismic energy land sources have been constructed in compact and mobile form provided with a tank or container which may be a dome-shaped bell, having a displaceable diaphragm at the bottom to enclose an incompressible liquid such as water. One or more air guns are positioned within the contained liquid for suddenly releasing pressurized gas, usually compressed air, into the liquid for generating powerful seismic impulses transmitted down through the diaphragm into the earth.

Detailed information with respect to such prior mobile seismic energy land sources is disclosed in U.S. Pat. Nos. 3,310,128; 3,779,335; 3,800,907; and 4,108,271, which are assigned to the assignee of the present invention.

Such prior land seismic sources have proven to have numerous advantages in actual use. In well velocity shooting and vertical seismic profiling, there are instances where it is desirable to utilize a plurality of seismic sources in an array near the mouth of the well. When such prior land seismic sources are used, there is a vehicle associated with each source, and so an array of vehicles is required in arranging an array of seismic sources near the well. The present invention advantageously enables one vehicle to provide an array of seismic sources near a well.

SUMMARY OF THE INVENTION

Accordingly, it is an object of this invention to provide method and system for well velocity shooting and vertical seismic profiling wherein a single vehicle transports a plurality of seismic land sources to the well site, where an array of these sources may conveniently be set up to perform the seismic investigation.

Among the advantages of this invention are those resulting from the fact that the method and system provided for well velocity shooting and vertical seismic profiling are easy to employ, easy to handle, easy to set up at the well site, and the array of seismic sources, each including at least one airgun, provides considerably more power than the single vehicle land sources of the prior art.

The present invention also provides the capability to make a so-called "walkaway" Vertical Seismic Profiling (VSP) Survey. This technique calls for the seismic energy source offset distance from the well to be changed a number of times as the geophone equipment is positioned at each level within the well. Thus, a number of the seismic source containers equal to the number of offset shot locations are conveniently provided. Among the major advantages of this method of performance walk-away VSP Surveys is that time-consuming movements of the seismic impulse source into different offset locations are eliminated, because the respective seismic source containers are already positioned at the desired offset locations. Consequently, successive offset "shots" can be fired as soon after each other as permitted by the recording time needed to receive the resultant seismic signals passing through the earth to the geophone equipment, normally less than six seconds.

In carrying out this invention, in one illustrative embodiment thereof, method and system for well velocity shooting and vertical seismic profiling are provided which involve transporting to a well site a plurality of nesting containers each having a displaceable diaphragm on a single vehicle. The containers are transported in nested pairs. At the well site the nested containers are separated and are arranged in any desired array near the well mouth with the displaceable diaphragms in contact with the ground. The containers are filled with liquid, and air guns are suspended in the liquid. These airguns are fired for suddenly releasing pressurized gas, usually compressed air, into the liquid for generating and transmitting powerful seismic impulses into the earth near the well. Geophone equipment which has been lowered down into the well is connected to electronic recording and/or processing equipment at ground level serving for recording or processing the signals resulting from the seismic impulses. The airguns are fired in a predetermined manner in the array of containers, for example, they all may be simultaneously fired or they may be fired in sequence, for providing the desired pattern of seismic waves which are transmitted into the ground from the displaceable diaphragms of the respective containers in the array. The geophone equipment is positioned at different levels in the well as the airguns are repetitively fired in the array of containers for obtaining information concerning geologic structures around the well and possible oil or gas bearing regions near the well. The total mass of the liquid in the container can be increased by adding density-increasing material to the water, for example, "drilling mud" for optimizing seismic energy transmission into the earth.

BRIEF DESCRIPTION OF THE DRAWINGS

The invention, together with further objects, features, advantages and aspects thereof will be more fully understood from a consideration of the following description taken in conjunction with the accompanying drawings. The drawings are not necessarily to scale, emphasis instead being placed upon illustrating the principles of the invention.

DESCRIPTION OF THE PREFERRED EMBODIMENTS

Figure 1:
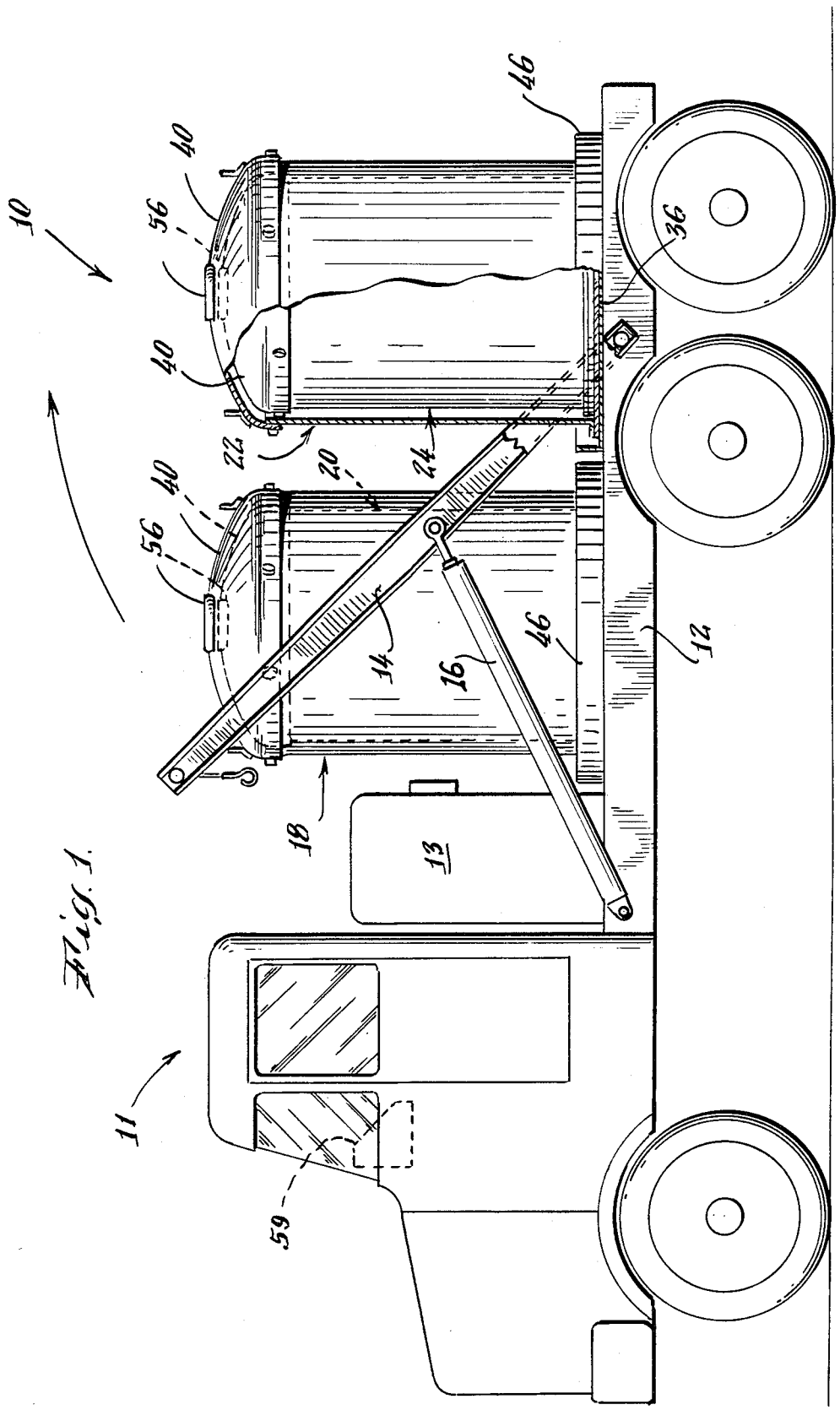
FIG. 1 is a side elevational view of a land vehicle containing two nested pairs of tanks for serving as seismic energy sources in accordance with the present invention, for example, for well velocity shooting and vertical seismic profiling.

Referring now to FIG. 1, there is shown a mobile seismic land source system 10 in accordance with the present invention. This system includes a truck vehicle 11 having a bed 12 for transportation to a desired site to be seismically surveyed. The vehicle 11 includes an air compressor 13 for providing pressurized gas to a plurality of air guns employed in the respective seismic sources and a lifting frame crane 14 having operating cylinders 16 coupled thereto which are actuated by hydraulic fluid for moving the seismic sources on and off of the bed 12 of the vehicle 11.

The seismic sources as shown comprise four circular cylindrical tanks 18 and 20, and 22 and 24 which are positioned on the bed 12 of the vehicle 10 in nested pairs; tank 18 being positioned inside of the tank 20, while tank 22 is positioned inside of the tank 24. The purpose of the nesting tanks is to permit four relatively large diameter tanks to be carried on one vehicle 11. As will be explained more fully hereinafter, the tanks 18, 20, 22 and 24 when being transported are not filled with water. Accordingly, the entire system 10 has a relatively low highway weight for the total number of sources which are available from a single vehicle.

Figure 2:
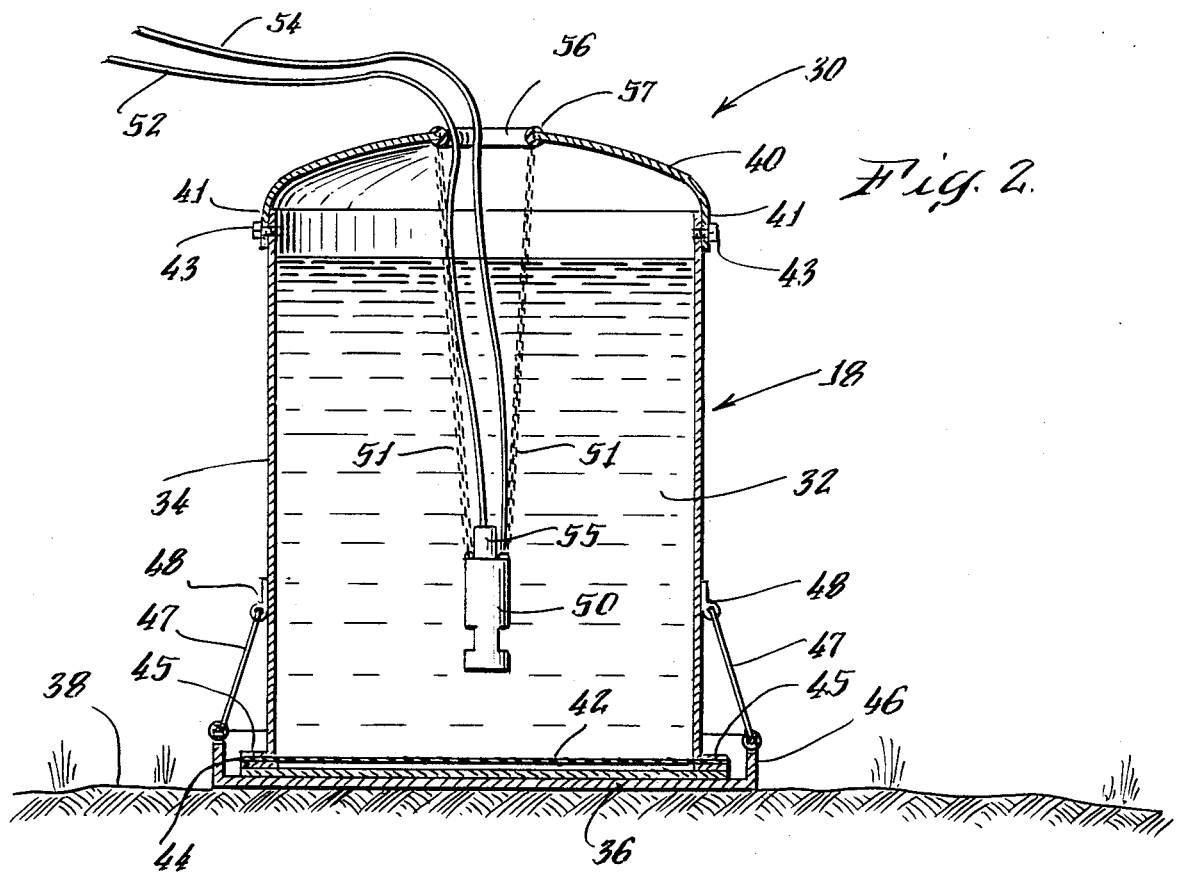
FIG. 2 illustrates an enlarged elevational sectional view of one of the seismic land sources after being unloaded from the vehicle in FIG. 1, in place at the well site and filled with liquid and with an airgun mounted therein.

FIG. 2 illustrates one of the seismic sources removed from the vehicle and set up for operation at a survey site, for example, using the tank 18. This seismic source 30 comprises the tank 18 filled with a noncompressible liquid such as water 32. The tank 18 is filled at the survey site after being lifted down onto the ground by the crane 14. The tank 18, as well as each of the other tanks 20, 22 and 24, has an upright circular cylindrical wall 34 covered at the lower end by a steel pan 36 which is positioned against the surface of the earth 38 when the tank is removed from the vehicle 10. The tank 18 has a removable lid 40 which covers the tank at the upper end. The lid 40 is preferably of steel and has a central opening 56 therein and is secured to the top of the wall 34 by a peripheral flange 41 on the lid which overlaps down around the top of the wall 34. This flange 41 is removably fastened to the wall 34 by machine screws 43.

The bottom of the tank is closed by a strong flexible diaphragm 42 of tough resilient material, such as rubber or polyurethane, which extends across the bottom of the tank like a flat drum head and rests upon the pan 36. The perimeter of this diaphragm 42 is clamped by a clamping ring 44 and a plurality of machine screws (not shown) to a flange 45 on the bottom of the wall 34, thereby being firmly secured for sealing the tank against leakage. The diaphragm 42 in this configuration provides for unimpeded transmission of the powerful seismic impulses through itself and through the metal pan 36 into the surface of the earth 38.

There is an upstanding rim 46 on the metal pan 36. This rim 46 is attached by removable resilient nylon straps 47 to pad eyes 48 welded onto the tank wall 34. Thus, when the tank is lifted, these straps 47 support the pan 36 so it is lifted along with the tank.

An air gun 50 is suspended by support cables or chains 51 from the lid 40 and is submerged well under the surface 53 of the liquid 32, with the airgun 50 being positioned near the bottom 42 of the tank. An electrical cable 52 and an air hose 54 are coupled through the central opening 56 in the top of the lid 40 to the airgun 50 for supplying it with compressed air from the air compressor 13 and for transmitting electrical signals to a solenoid valve 55 for firing the airgun 50.

The purpose of the airgun 50 is to suddenly release a relatively large quantity of high pressure gas abruptly into the liquid 32 to generate powerful impulses which are transmitted as powerful seismic waves through the diaphragm 42 and the pan 36 into the earth 38. The relatively large quantity of water 32 above the airgun 50 provides a mass against which the abruptly released gas thrusts to produce the powerful impulse. The mass of the water above the airgun serves to enhance the strength of the seismic waves being transmitted down into the earth, and the mass of the tank and water generally limits the upward reaction movement of the entire tank after the gun is fired.

The airguns 50 which are employed in the tanks of the present invention are described in greater detail in the above-cited patents.

Figure 3:
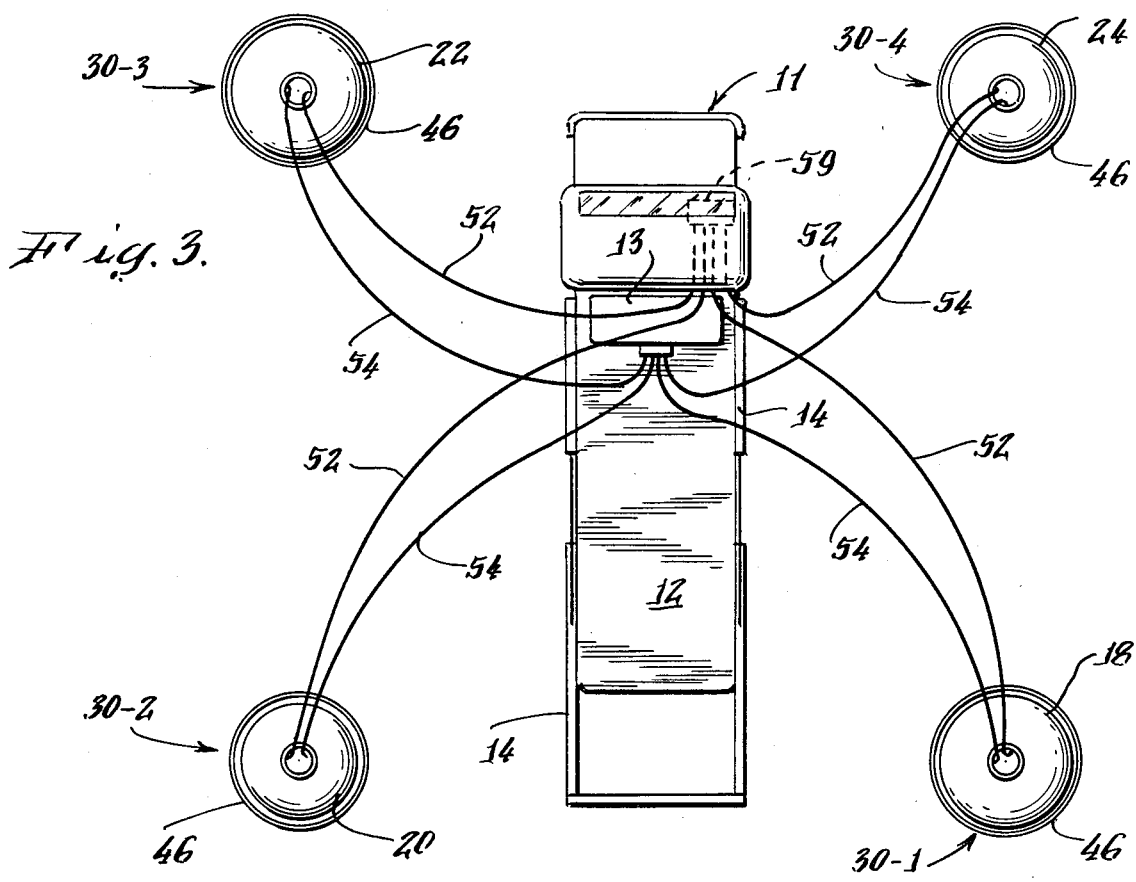
FIG. 3 illustrates a top view showing the seismic sources arranged about the truck in operative position in a square array; it is to be understood that these four sources may be positioned in any desired possible array near the mouth of the well.

FIG. 3 illustrates a field deployment of the two nested pairs of tanks 18 and 20, and 22 and 24 illustrated in FIG. 1. The tanks are removed from the bed of the vehicle 11 by the lifting frame 14 and are moved empty to their proper location with the compressed air hoses 54 connected to the compressor 13 and the electrical cables 52 running to a control center in the truck. There is a metal pan 36 placed beneath each tank and strapped to its tank by the straps 47. The tanks are then filled and an airgun is suspended in the liquid in each tank near the bottom of the tank, thus outfitting each tank to form a respective seismic source 30-1, 30-2, 30-3, and 30-4. The seismic sources may be aligned in a linear array or formed in any type of two dimensional array, for example, the square array, as illustrated in FIG. 3. The electrical firing cables 52 from the solenoid valves 55 of the respective airguns 50 are connected to electronic firing control means 59 on the vehicle.

Each of the tanks 18, 20, 22 and 24 is approximately seven or eight feet tall. The two outer tanks 18 and 22 of the nested pairs have a somewhat larger diameter than the two inner tanks 20 and 24. The difference in diameters is sufficient for the outer tank to accommodate freely with clearance the diaphragm clamping flange 45 on the inner tank when nested within the outer tank. A convenient method of nesting the pair of tanks is to remove the screws 43 so that the lid 40 can be removed from the tank 18 after this tank together with its pan 36 has been lifted empty into its travelling position on the truck bed 12. Then the nylon straps 47 are removed from the tank 20 so that the tank 20 can be lifted up without its pan to be set down within the tank 18. The lid may remain on the inner tank. After the inner tank is set down in nested relation within the outer tank, the lid 40 is placed back on the outer tank and is temporarily secured in position by reinserting a few of the screws 43. The now separate pan 36 for the inner tank 20 is placed on edge on the truck bed between the compressor 13 and the outer tank 18 and is strapped down to hold it in place. The second pair of tanks 22 and 24 are similarly nested together in travelling position, and the separate pan 36 for the inner tank 24 is strapped on edge on the truck bed adjacent to the other separate pan.

The outer tanks 18 and 22 for example have a diameter of approximately five feet eight inches, not counting the diaphragm clamping flanges 45. The inner tanks 20 and 24 have a diameter of approximatey five feet, not counting the flange 45. The opening 56 in the center of the lid 40 is 5 to 6 inches in diameter, and the edge of this opening is covered by chafing gear 57, for example such as a tough rubber molding for preventing abrasion of the electric firing cable 52 and high pressure air hose 54.

Figure 4:
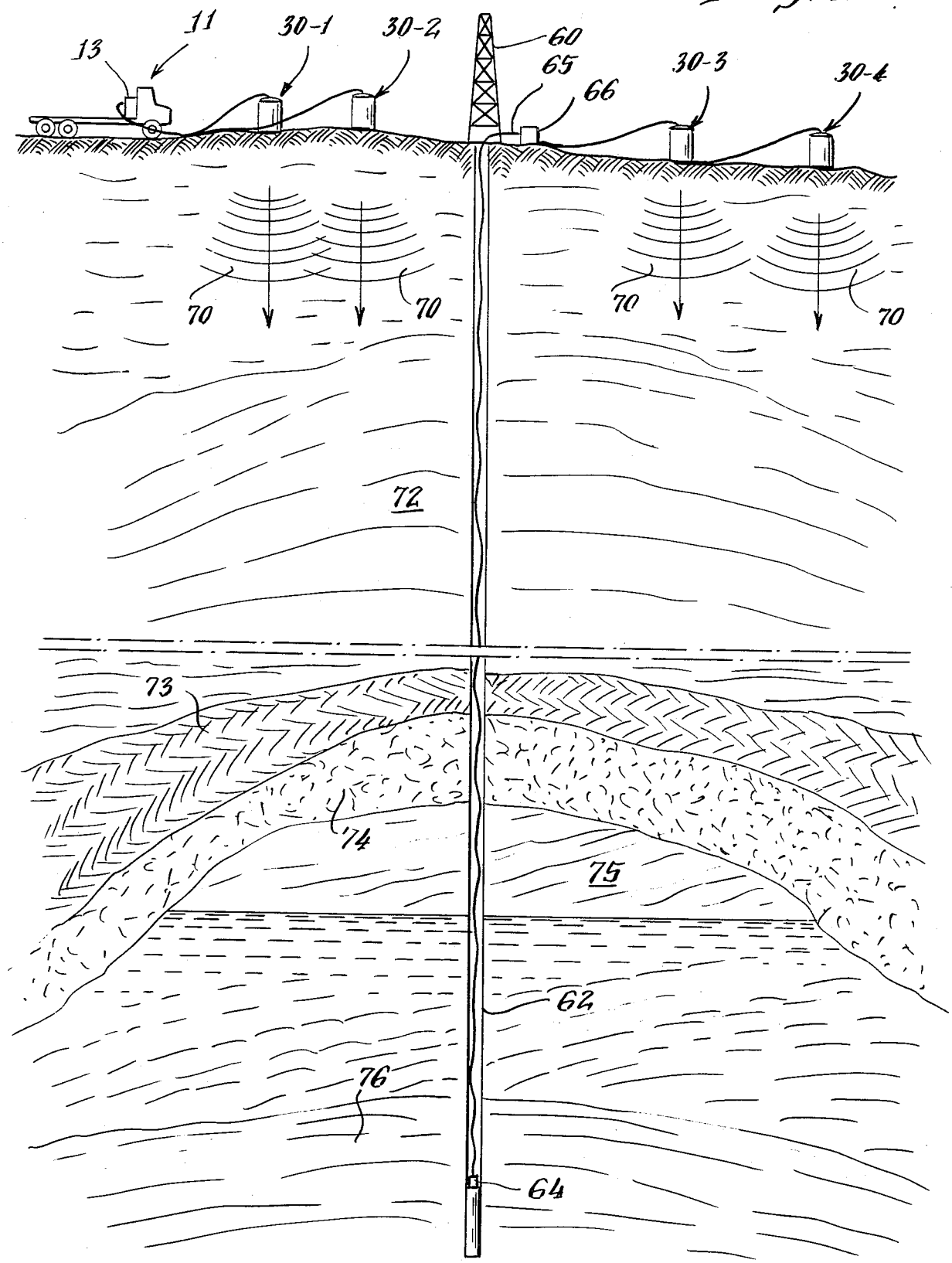
FIG. 4 is an elevational cross-sectional view of a well and the surrounding portion of the earth illustrating an array of these mobile seismic sources in use around a well site.

FIG. 4 illustrates seismic well investigation in accordance with the present invention in which the vehicle 11 has been driven to the well site, and the seismic sources 30-1, 30-2, 30-3 and 30-4 disposed on either side of the well tower 60. The well bore 62 has geophone equipment 64 suspended therein for sensing the vibrations which are transmitted through the earth. The geophone equipment 64 is connected by electric cable 65 to recording and signal processing equipment 66 above ground. The airguns in the seismic sources 30 are fired simultaneously or in predetermined sequence in accordance with the desired program for sending powerful vibrational waves 70 into the earth adjacent the well bore 62. The impulses 70 travel through and are reflected, refracted and otherwise affected by the various strata and geological formations 72, 73, 74, 75, 76, etc. and are picked up by the geophone equipment 64 and processed by the equipment 66. The geophone equipment 64 is elevated or lowered incrementally to various levels in the well bore as the airguns are fired to provide a desired investigation of the geological environment of the well bore.

Advantageously, the present invention enables at least four land seismic sources 30-1, 30-2, 30-3 and 30-4 to be transported by one self-propelled vehicle 11. Moreover, this invention enables an array of such land seismic sources to be arrayed in any desired pattern near the mouth of a well for transmitting powerful seismic impulses into the earth having approximately four times the power of a single unit of prior art type of self-propelled source. The impulses may be transmitted repetitively and the time relationships of the various sources in the array may be utilized in various programs to investigate the geologic formations 72, 73, 74, 75, 76, etc. surrounding the well bore 62.

The seismic source parameters of the respective containers such as the airgun firing volume and/or pressure, the quantity of the water in the respective containers, may intentionally be arranged to be different among the various tanks 18, 20, 22 and 24 in order to randomize any secondary impulses which result from the bouncing of the sources on the earth subsequent to the transmission of the initial powerful impulse generated by the firing of the respective airgun. Also, these source parameters may be varied at any time as desired in order to optimize the seismic impulses being transmitted into the earth from the array of seismic sources. The sources 30-1, 30-2, 30-3, and 30-4 may also be deployed in different arrays, for example, linear, radial, square, triangular, relative to the well bore in order to optimize the transmissions to provide various kinds of geologic information.

In the event that the well survey being performed is a "walkaway" VSP Survey, then a number of sources 30-1, 30-2, 30-3, 30-4, . . . 30-n (where "n" is the desired number of offset locations) may advantageously be used. The respective seismic sources 30-1, . . . 30-n are positioned at the desired offset locations before the survey begins. Then, successive offset "shots" (powerful seismic impulses) can be fired as soon after each other as permitted by the recording time needed to record all of the data from the preceding shot, which is normally less than about six seconds. The time-consuming prior art procedure is thereby eliminated, namely, the procedure of moving the seismic source from one offset location to the next in order to fire the successive offset shots.

When a particular well seismic investigation is finished, the tanks 18, 20, 22 and 24 are drained, reloaded on the vehicle 11 and moved to the next site with extreme facility in the manner described above, thereby providing a very powerful seismic system which is mobile in character and a method which is flexible and adaptable in use.

Instead of using nesting pairs of containers, as illustrated, it is also desirable to use nesting trios of containers or larger numbers of nesting containers for increasing the capacity of each vehicle in terms of the number of seismic sources 30 carried by the vehicle. Moreover, the carrying capacity of the vehicle itself is desirably increased by using a flat-bed trailer having a so-called "low bed" in which the upper surface of the trailer bed is below the top surface of the vehicle tires for increasing the headroom capacity for carrying taller tank, while still being able to pass underneath overhead highway bridges and underpasses.

In order to increase the total mass of the liquid in each container, density-increasing material known as "drilling mud" is mixed with the water for optimizing the transfer of seismic energy into the earth. Moreover, if desired, more than one airgun can be suspended in each container for simultaneous firing for increasing the power of each "shot".

Since changes and modifications varied to fit particular operating requirements and environments will be understood by those skilled in the art, the invention is not considered limited to the examples chosen for purposes of illustration, and includes all changes and modifications which do not constitute a departure from the true spirit and scope of this invention as defined in the following claims as encompassed within reasonable equivalents of the claimed elements.

I claim:

1. A method of well velocity shooting and vertical seismic profiling comprising the steps of:
    transporting on a single vehicle to a well site a plurality of at least two nested pairs of containers, each container having a displaceable diaphram on the bottom thereof,
    separating said nested pairs of containers and arranging at least four of said separated containers from said nested pairs in a desired array near the well site with their respective displaceable diaphragms being placed in impulse-transmitting relationship with the ground near said well, filling each of said separated containers with liquid at the well site, filling each of said containers with a different mass of water from the others in the array for randomizing any secondary impulses which may be generated by bouncing of the containers, mounting an airgun which may abruptly release pressurized gas in the liquid in each of said separated containers, and firing said airguns in a predetermined manner thereby abruptly releasing pressurized gas into the liquid in said containers for providing powerful seismic impulses which are transmitted into the ground near the well by the displaceable diaphragms of said containers.

2. The method as claimed in claim 1, including the steps of:

adding density-increasing material to the liquid in each container.

3. A method of well velocity shooting and vertical seismic profiling comprising the steps of:

transporting on a single vehicle to a well site a plurality of at least two nested pairs of containers, each container having a displaceable diaphragm on the bottom thereof, separating said nested pairs of containers and arranging at least four of said separated containers from said nested pairs in a desired array near the well site with their respective displaceable diphragms being placed in impulse-transmitting relationship with the ground near said well, filling each of said separated containers with liquid at the well site, selecting at least one seismic source parameter to be different among the various containers, said seismic source parameter being selected from the group of parameters comprising: mass of water in the respective container, firing volume of the airguns in the respective containers, pressure of the pressurized gas being discharged from the airguns into the liquid in the respective containers, and amount of density-increasing material added to the liquid in the respective containers, mounting an airgun which may abruptly release pressurized gas in the liquid in each of said separated containers, and firing said airguns in a predetermined manner thereby abruptly releasing pressurized gas into the liquid in said containers for providing powerful seismic impulses which are transmitted into the ground near the well by the displaceable diaphragms of said containers.

4. The method of performing a walkaway vertical seismic profiling survey of an oil and/or gas well comprising the steps of:

transporting on a single vehicle to well site a plurality of at least two nested pairs of containers each having a displaceable bottom diaphragm on the bottom thereof, separating said nested pairs of containers and positioning said separated containers at the desired respective offset locations from the mouth of the well with their respective displaceable diphragms placed in impulse-transmitting relationship with the ground, filling each of said separated containers with liquid at the well site, mixing density-increasing material known as "drilling mud" with the liquid in each container for increasing the total effective mass of liquid in each container, mounting an airgun in each of said separated containers which can abruptly release pressurized gas into the liquid in said container, suspending geophone equipment at a first level within the well, firing the airguns in the liquid-filled containers in a desired sequence for transmitting seismic impulses down through the earth to the geophone equipment, and positioning said geophone equipment at a second level within the well, again firing the airguns after a known time interval in the liquid-filled containers in a desired sequence for again transmitting seismic impulses down through the earth to said geophone equipment.

* * * * *